(12) United States Patent
Pruett et al.

(10) Patent No.: US 6,557,249 B1
(45) Date of Patent: May 6, 2003

(54) OPTICAL FIBER DEPLOYMENT SYSTEM AND CABLE

(75) Inventors: Rick Ray Pruett, Bakersfield, CA (US); Craig W. White, Exeter, RI (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/557,580

(22) Filed: Apr. 22, 2000

(51) Int. Cl.⁷ .............................................. H01R 43/00
(52) U.S. Cl. ........................... 29/825; 29/460; 29/33 D; 385/123
(58) Field of Search ............................. 29/825, 407.01, 29/33 D, 460, 458; 385/123

(56) References Cited

U.S. PATENT DOCUMENTS

| | | | |
|---|---|---|---|
| 4,232,935 A | * 11/1980 | Rohner et al. | |
| 4,477,147 A | * 10/1984 | Winter et al. | |
| 4,479,984 A | 10/1984 | Levy et al. | 427/54.1 |
| 4,594,766 A | * 6/1986 | Smith, Jr. et al. | |
| 4,790,623 A | * 12/1988 | Winter et al. | |
| 5,380,977 A | * 1/1995 | Yoshie et al. | |
| 5,582,748 A | * 12/1996 | Yoshie et al. | |
| 5,593,736 A | 1/1997 | Cowen et al. | 427/492 |
| 5,636,307 A | 6/1997 | Cowen et al. | 385/102 |
| 6,223,407 B1 | * 5/2001 | Staschewski et al. | |
| 6,327,767 B1 | * 12/2001 | Puhakka et al. | |
| 6,404,961 B1 | * 6/2002 | Bonja et al. | |

FOREIGN PATENT DOCUMENTS

JP                04-188514          * 7/1992

* cited by examiner

Primary Examiner—Carl J. Arbes
(74) Attorney, Agent, or Firm—Don E. Erickson

(57) ABSTRACT

The present invention is a strengthened fiber optic cable and the process for inserting the strengthened cable into a duct. The invention consists of pre-coating a fiber optic waveguide with an ultra violet (UV)/visible light curable resin such that the resin buffers the fiber optic waveguide. The pre-coated fiber optic waveguide is then cured in an UV/visible light oven at a temperature at ambient or above. An UV/visible light curable resin is pre-heated to a selected temperature and the buffered fiber optic waveguide and the at least one reinforcing fiber are transported through a binding resin bath, the fiber optic waveguide maintaining linear alignment throughout the bath as at least one reinforcing fiber is disposed about the fiber optic waveguide. The resin coated fiber optic waveguide and the least one reinforcing fiber are then cured in an UV/visible light curing station so as to form a fiber optic cable. The fiber optic cable is then transported to and insertion means which imparts sufficient translational force to the cable to impel the cable to a selected location in a duct.

96 Claims, 3 Drawing Sheets

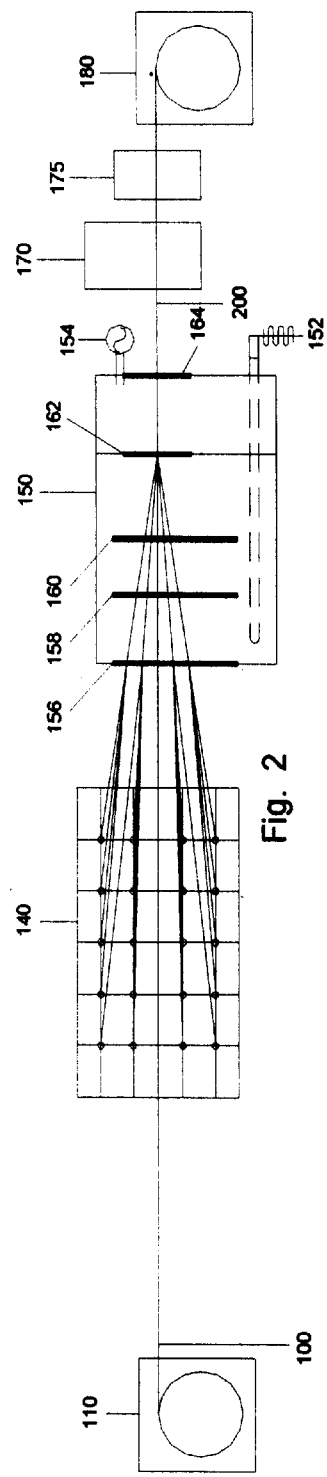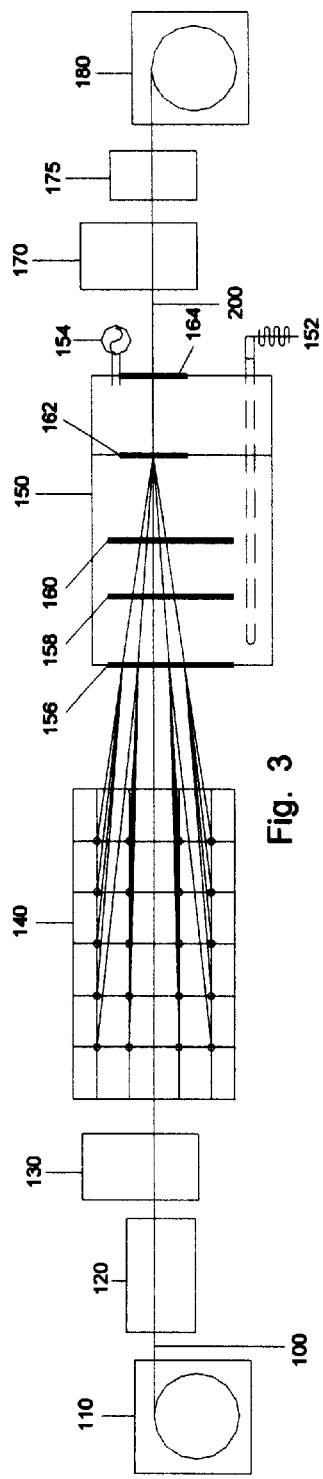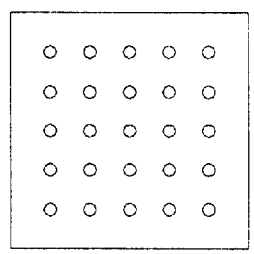

OPTICAL FIBER DEPLOYMENT SYSTEM AND CABLE

BACKGROUND OF THE INVENTION

1. Field of the Invention

The present invention generally relates to the field of fiber optic communications and more particularly to fiber optic cables, and more particularly to a process and apparatus for installing and retrieving a fiber optic cable in difficult locations, such as oil, gas and geothermal well bores, buildings, vessels, such as aircraft and ships, conduits, or in other extreme or difficult environments. Specifically, the present invention provides a process for treating a fiber optic microcable to provide a strengthened member and means of inserting and retrieving the cable in such structures.

2. Background of the Art

Fiber optics are used to carry transmission signals for cable television applications, data transmissions, as well as for use as sensors in the measurement of temperatures and pressures under various conditions. More recently, due to their higher capacity for transferring data, inherent abilities to withstand temperature variances, ability to perform distributed temperature sensing, and their reduced size, optical fiber cable has started to replace conventional electronic cables and gauges. Frequently, when the purpose of deployment is for testing, an electrical conductor is also installed to operate a testing device or apparatus. In many instances, the optical fiber cable is deployed in a conduit that has already been installed in the structure. A fiber optic microcable is basically comprised of a glass or plastic fiber core, one or more buffer layers, and a protective sheath. If there are no means of pulling the cable into the conduit, then the optical fiber must be of a light weight, such as a single optical fiber strand, coated with a thin layer, 125 microns, of a protective material. Such an optical fiber strand is both fragile and flexible, however the light weight is necessary so that the optical fiber may be inserted over the full length of the conduit by means of pressurized fluid injection. The protective sheath is typically composed of a heat polymerized organic resin impregnated with reinforcing fibers. Conventional resin materials are typically polymerized or cured at temperatures which may exceed 200° C. Such cables are not sufficiently robust for installation in well bores where the operating temperatures may reach 150° C. The protective sheath is typically composed of a heat polymerized organic resin impregnated with reinforcing fibers. In addition, the micro-cables frequently must be installed at lengths of up to 40,000 feet. State-of-the-part apparatus for installing such fiber optic microcable typically include means for pulling the cable from a cable reel, propelling the cable by means of tractor gears, or a capstan, and in some cases, impelling the cable through the duct by means of fluid drag. In some horizontal duct installations, a drogue is first fed through the duct, and the cable is then pulled through the duct by means of the drogue itself, or by a pulling line attached to the drogue at one end and the cable at the opposite end. All of the state-of-the-art methods for installing the cable place various stresses on the fiber optic core, causing degradation in the performance of the cable, and reducing the ability of the cable to resist conditions in which the cable may be installed.

U.S. Pat. No. 5,593,736 to Cowen discusses state-of-the-art processes for strengthening optical fiber cables, and details the reasons why the fiber optic properties are degraded by the strengthening processes. Cowen then describes and claims a process for fabricating a protective sheath about a fiber optic microcable, the process consisting of bathing the microcable in an ultraviolet light curable resin which may be impregnated with fibers to enhance the physical strength characteristics of the microcable. However, one of ordinary skill in the art would recognize that the cable of Cowen can not be installed in high-temperature environments due to the inherent properties of the resin. The fiber of Cowen has a glass transition temperature range of 60–105° and a strain elongation at failure of 1½%. Cowen teaches the use of a resin that is viscous at ambient temperatures. Such a resin would break down at high temperatures. As such, the Cowen process does not produce a microcable sufficiently rugged to be used in well bores and other high temperature environs. In addition, the process of Cowen itself can cause degradation of the optical properties of the fiber optic cable. It has been discovered that passing the fiber optic cable through too many rollers and/or tensioners, as with Cowen, can result in damage to the glass or plastic fiber core, cause micro-bends or broken fiber strands, and further degrade the cable. This is particularly true using standard telcom-grade multi-mode cable. Further, the process of Cowen cannot produce a cable that can be installed in high-temperature locations, the matrix coating of the cable of Cowen loses mechanical integrity and degrades rapidly at temperatures in excess of 150° C.

U.S. Pat. No. 4,479,984 to Levy et al. describes a process in which multi-filament bundles are impregnated with an ultraviolet curable resin to form a composite material suitable for use as a strength member in cables and other applications.

SUMMARY OF THE INVENTION

The present invention provides a process and apparatus for installing a fiber optic microcable in structures, where integrity of the cable is critical, and where such strengthened cable may be deployed, which process and apparatus overcome problems inherent in the prior art of cable installation. The resin selected is not limited to low viscosities at ambient temperatures as needed by Cowen and such resins need not be applied at ambient temperatures. The result is a process which can use high performance resins, with higher viscosities than the Cowen process permits, that are applied at an elevated temperature, and when cured, allow the resultant microcable to withstand high temperature environments. The process permits the construction of a cable with a strain elongation at failure greater that 2%, and which can match the strain elongation at failure of the reinforcing members. The process provides for fabricating a protective sheath, comprised of an ultra violet (UV)/visible light curable resin, about a standard fiber optic cable. The resultant fiber optic cable is relatively semi-rigid, permitting the pushing of the fiber optic cable into the duct. The fiber optic cable is then fed into a means for installation in said duct, and impelled in the duct to a selected location. For the purposes of this invention, a duct is defined to include any structure through which, or into which, it is desirable to insert fiber optic cable. The duct may be a channel, conduit, pipe, well bore, or tube, either in a closed or open system, all of which collectively will be referred to as a duct. The duct may be horizontal, vertical, slanted, or a combination of the foregoing, housed in aircraft, buildings, vessels, or in oil, gas or geothermal wells.

OBJECTS OF THE INVENTION

One object of the invention is to produce a fiber optic cable that may be installed in a duct without degrading the optical properties of the fiber optic.

A second object of the invention is to produce a cable that is resistant to temperatures in excess of 260° C.

It is a third object of the invention to produce means for installing the cable in the duct.

BRIEF DESCRIPTION OF THE DRAWINGS

FIG. 2 is a pictorial drawing of one embodiment of the apparatus for strengthening the cable FIG. 3 is a pictorial drawing of a second embodiment of the apparatus for strengthening the cable FIG. 4 is a plane drawing of a guide plate of the apparatus.

DESCRIPTION OF THE PREFERRED EMBODIMENT

Figure 1:
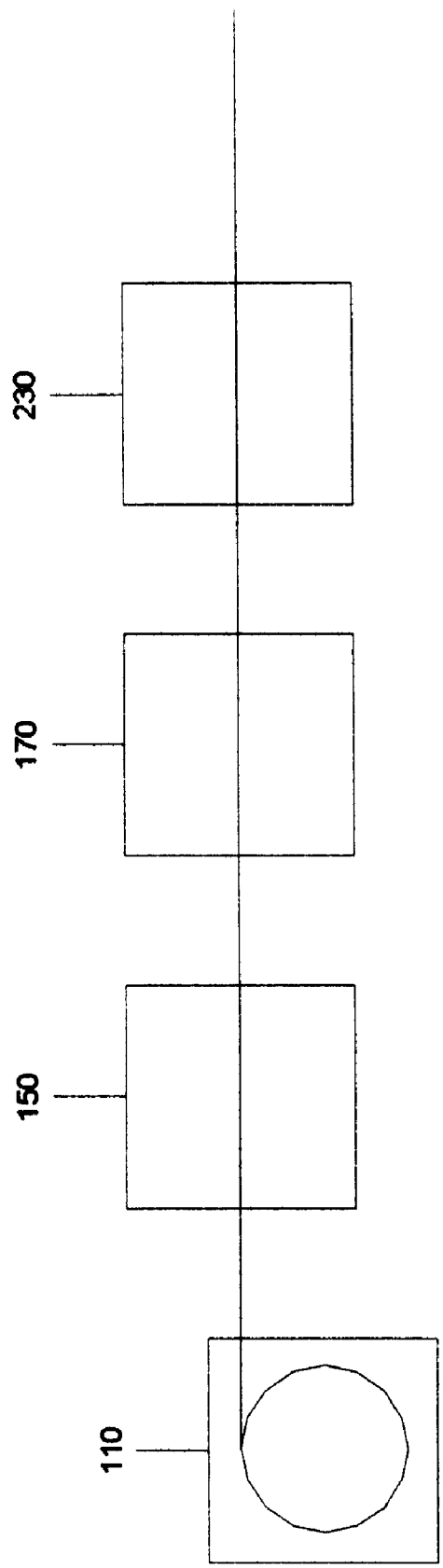
FIG. 1 is a schematic drawing of the process for installing a cable in a duct.

Referring to FIGS. 1 and 2, a fiber optic waveguide 100, as typically received from a manufacturer, includes a buffer and core, is shown on optic feed reel 110. Waveguide 100 is commercially available from various sources. Standard multimode fiber core is available from Corning. Alternatively, a hermetically sealed multimode fiber core, designed for high temperature, is available from Spectram. Reel system 140 contains a plurality of feed packages (not shown) containing reinforcing fibers 142. The number of reinforcing fibers 142 can be varied, dependent on the amount of tensile strength to be imparted to the cable. Such reinforcing fibers 142 may be glass, Aramid, carbon, Spectran, ultra high molecular weight polyolefin, or equivalent reinforcing material, and in some cases, an electrical conductor. The combined waveguide 100 and reinforcing fibers 142 are drawn from their respective reels and through resin bath 150 and UV/visible curing station 170 by pulling means 175. Pulling means 175 may be any conventional method for pulling cable, such as a capstan, winch, opposing tractors, or the like.

Waveguide 100 is fed directly to entry plate 151 of resin bath 150 without the need of being guided by feed rolls. Entry plate 151 (a plane view of which is depicted in FIG. 4) is adapted to sealingly receive both waveguide 100 and the plurality of reinforcing fibers 142 to allow fresh resins to continuously wet and lubricate the entrance opening of the waveguide 100 and the plurality of reinforcing fibers 142. The geometry of waveguide 100 in relation to reinforcing fibers 142 is determined when initially feeding waveguide 100 and reinforcing fibers 142 into resin bath 150 through entry plate 151, however, typically reinforcing fibers 142 are simultaneously pulled parallel to and radially about waveguide 100. Resin bath 150 contains a UV/visible light curable resin, which is maintained at a constant temperature of between about 60° C. to about 100° C. by heating means 152, such as a re-circulating heat exchanger. The resin is re-circulated through resin bath 150 by pump 154 so as to create a resin flow in the direction opposite to the direction of pull of waveguide 100 and cable 200 through resin bath 150. The geometric relationship of waveguide 100 vis-á-vis reinforcing fibers 142 is maintained as they are drawn through resin bath 150 by cable guides 158 and 160, which have the same guide geometry as entry plate 156, but which provide a progressively convergent path in order to guide waveguide 100 and reinforcing fibers 142 to a convergent point at focal plate 162, which is sized to receive the resin coated waveguide 100 and reinforcing fibers 142 at a selected outside diameter. The resin of resin bath 150 is typically a formulation of heterocyclic high temperature (meth)acrylate with a cured glass transition of greater than 150° C. This formulation is optimal for reinforcing a cable which may encounter temperatures in excess of 260° C. In those situations where a lower temperature may be encountered, such as 200° C., a formulation using less (meth)acrylate may be used, as would be known by one of ordinary skill in the art. It is understood that the number of holes in entry plate 156 and cable guides 158 and 160 can be of any selected number, and that typically waveguide 100 will be fed through a center hole with strength members radially and uniformly disposed about waveguide 100.

Upon exit from focal plate 162 the combined waveguide 100 and reinforcing fibers 142 now form a cable 200 which is pulled through the remaining portion of resin bath 150 and through exit plate 164, which is also sized to a selected diameter to remove undesired amounts of resin. Resin coated cable 200 is then drawn through an ultra-violet/visible light curing station 170 at a constant speed of 20 feet per minute, curing station 170 having a power rating of 300 watts per inch, and being 10 inches in length. Such UV/visible light ovens are commercially available from Fusion and are well known in the art. The above rate, power rating and length are not limitations of the invention. The speed through curing station 170 is only dependent on the power of the curing station and the formulation of the UV/visible light curable resin. Curing stations may have a rating greater than 300 watts. The length is either increased or decreased dependent upon the power of the curing station and the curing characteristics of the resin, varying from about 1 inch to about 96 inches, as would be understood by one of ordinary skill in the art.

Upon curing, cable 200 is disposed on take-up reel 180, or alternatively, fed directly into the means for inserting cable 200 in the duct, as described below. The silicone-sheathed cable and strength members are then collected on a storage means, such as a cable reel. Alternatively, the strengthened cable may be fed directly into the means for inserting the cable into a duct as described below.

FIG. 3 depicts a second embodiment of the invention wherein the waveguide 100 is additionally pre-treated with an UV/visible light curable soft cushioning buffer layer prior to being fed into the resin bath of FIG. 2. The buffer layer provides an additional sheath about the periphery of the fiber of approximate thickness of 50 microns. This additional buffer layer can be a silicone resin. As in the first embodiment, waveguide 100 is drawn from reel 100, and is then fed through a pre-treatment resin bath 120 containing an UV/visible light curable silicone resin, which resin is maintained at ambient temperature. If it is desired to increase the linear speed of the line, the temperature may be raised from ambient to about 60° C. The parameters of treating waveguide 100 at ambient temperature are taught in Cowen. Waveguide 100 coated with the UV/visible light silicone resin is then fed into UV/visible light curing station 130, wherein the resin cures to provide a buffered fiber, which is then fed in to resin bath 150 in the same manner as in the first embodiment. As in the first embodiment, the optic strand is drawn from feed reel 110 into pre-treat resin bath 120, through UV/visible light curing station 130, into resin bath 150, through UV/visible light curing station 170 and to take-up reel 180, or directly to the injection means process described below, in a substantially linear path, and without being guided around any feed rolls in a manner that would tend to cause degradation of the optical properties of the fiber optic cable. Although the above embodiments have been discussed in terms of resin coating only one waveguide 100, it is contemplated that a plurality of waveguides and a plurality of reinforcing fibers could be combined in one cable.

Figure 5:
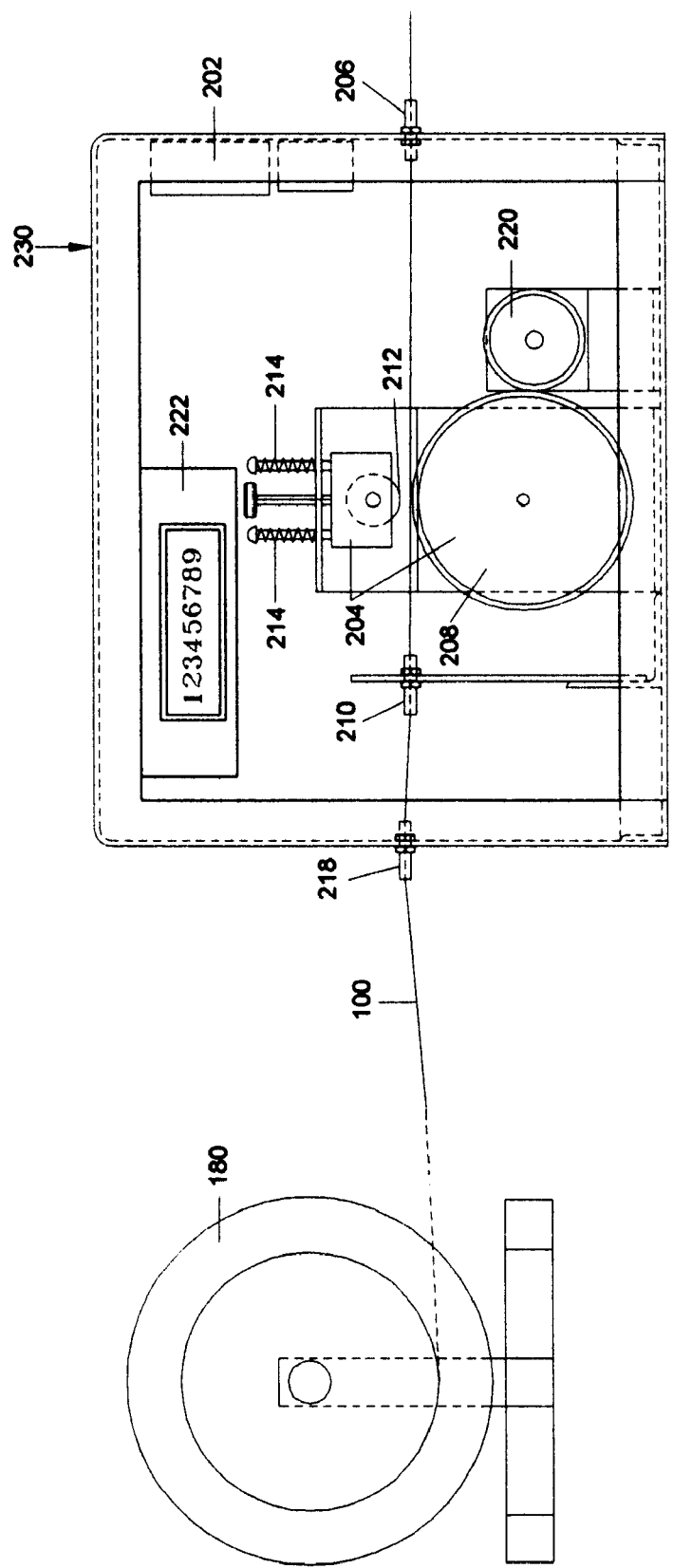
FIG. 5 is a plane view of apparatus for impelling the cable into a duct.

FIG. 5 describes a means 230 for inserting the strengthened cable 200 into a duct. It is irrespective whether or not there is any fluid pressure opposing the insertion of the cable. Upon exit from UV/visible light curing station 170 cable 200 is sufficiently rigid to permit it to be impelled into a duct, but cable 200 is also sufficiently flexible that it can be impelled around curves of approximately 12 inch radius. For the purposes of describing the invention, insertion means 230 will be sized for inserting cable 200 into capillary tubing. It should be appreciated, however, that cable 200 can be installed in any type duct.

Cable 200 is initially fed through a 0.25 inch outside diameter capillary tubing, inlet guide 206, linearly aligned with a motive force 204. Cable 200 is conducted through the feed wheel of 208 of motive force 204 and into a second capillary tube, outlet guide 210, which communicates between the motive force and external guide 210, which, in turn communicates with the duct (not shown). In the case in which the duct does not have any opposing fluid pressure, cable 100 may be directed straight into the duct. In some applications it will not be necessary to employ external guide 210, and cable 100 can be directed into the duct. In those instances in which there is opposing fluid pressure in the duct, the strengthened cable is fed through a pressure chamber (not shown) and then into the duct. Pressure chambers are commonly used in operating oil, gas and geothermal well systems and are known to one of ordinary skill in the art. Once cable 200 is in place, motive force 204 is actuated by applying power from power source 202, and cable 200 then feeds from take-up reel 180, or in some instances directly from UV/visible light curing station 170, through inlet guide 206, motive force 204, outlet guide 210, external guide 218, and into the duct. The motive force 204 may be selected which can impart the requisite amount of force to overcome opposing fluid pressure in the duct. In the exemplary embodiment, motive force 204 was selected to be motor driven feed wheel 208 which includes an adjustable following roller 212. Cable 200 was fed between feed wheel 208 and following roller 212, with the linear speed of the cable determined by the amount of tension applied to the cable by following roller 212. Tensioners 214 may be employed to adjust the bias of following roller 212 against the outside surface of cable 200 against feed wheel 208, thereby either increasing or decreasing the linear speed of cable 200 and without damaging fiber waveguide 100. The insertion means of the exemplary embodiment of FIG. 5 may also contain a counter pressure wheel 220 which monitors the number of linear feet of fiber optic cable deployed in the duct. Output from counter pressure wheel 220 can be visibly presented in counter 222. The means of monitoring the linear feet of fiber optic cable deployed is not restricted to a pressure wheel. There are many monitors known in the art for measuring linear feet of cable deployed, such as photo-optic sensors, laser trackers, and the like. Further, the invention is not limited by the means of motive power employed to insert the cable. For example, caterpillar drive may be used, the only restriction being that the means of motive force may not crimp or overly bend the fiber core, thereby imparting degradation to the cable.

Since cable 200 is of semi-rigid construction, it may be deployed and used in a manner hereto not possible. It is well known that the protective surfaces of cables for instruments, including fiber optic cable, deteriorate sufficiently over time in oil, gas, and geothermal well bores, and other corrosive or remote locations, due the high temperature and corrosive natures of the fluids in such well bores or locations, to become unstable and unusable. Yet it may be desirable to be able to periodically monitor parameters in the well bore without having to run a new fiber optic installation each time. It would be advantageous to install the instruments in the well boreand attached to the standard tubing permanently installed in the well bore. With the cable of the invention, such instruments may be adapted with a sealed optical coupler to receive the semi-rigid cable 200, then when it is desirable to monitor the well bore conditions, cable 200 is inserted in the well to the location of the selected instrument. into the optical coupler, permitting monitoring of the well bore.

Concomitantly, reinforcing fibers 142 could include an electrical conductor which could then be used to power the remote instrument, or a conductor could be attached to cable 200 upon insertion of cable 200 in the duct, permitting installation of the electrical cable with cable 200.

While the present description contains much specificity, this should not be construed as limitations on the scope of the invention, but rather as exemplifications of one/some preferred embodiment/s thereof. The full scope of the invention is further illustrated by the claims appended hereto.

We claim:

1. A process for inserting a fiber optic cable into a duct, the process including:
   (a) strengthening a fiber optic waveguide to form a semi-flexible cable; and
   (b) retrievably impelling the fiber optic cable into the duct.

2. The process of claim 1 wherein the step of strengthening the fiber optic waveguide includes:
   (a) receiving a fiber optic waveguide from a source;
   (b) disposing at least one reinforcing fiber about the fiber optic waveguide;
   (c) simultaneously coating the fiber optic waveguide and the at least one reinforcing fiber with an UV/visible light curable resin, the resin for binding the fiber optic waveguide and the at least one reinforcing fiber;
   (d) curing the binding resin coated fiber optic waveguide and the at least one reinforcing fiber so as to form a fiber optic cable; and
   (e) transporting the fiber optic cable to means for impelling the fiber optic cable into the duct.

3. The process of claim 2 wherein the step for receiving the fiber optic waveguide includes:
   (i) linearly aligning the fiber optic waveguide with a means for imparting the binding resin; and
   (ii) transporting the fiber optic waveguide to the means for coating the fiber optic waveguide and the at least one reinforcing fiber with the binding resin.

4. The process of claim 3 wherein the step for transporting the fiber optic waveguide to the means for coating the fiber optic waveguide and the at least one reinforcing fiber with binding resin additionally includes the steps of:
   (a) pre-coating the fiber optic waveguide with an UV/visible light curable silicone resin, the resin selected to buffer the fiber optic waveguide; and
   (b) curing the pre-coated fiber optic waveguide.

5. The process of claim 4 wherein the step for pre-coating the fiber optic waveguide is performed at a temperature of about ambient or above.

6. The process of claim 3 wherein the step for receiving the fiber optic waveguide includes the step of transporting the fiber optic waveguide by means of feed rolls and bobbins, in a substantially linear alignment, to the means for coating the fiber optic waveguide and the at least one reinforcing fiber with the binding resin.

7. The process of claim 2 wherein the step of simultaneously coating the fiber optic waveguide and the at least one reinforcing fiber with the binding resin includes the step of transporting the fiber optic waveguide and the at least one reinforcing fiber through a binding resin bath.

8. The process of claim 7 wherein the step of transporting the fiber optic waveguide and the at least one reinforcing fiber through the binding resin bath includes transporting the fiber optic waveguide and the at least one reinforcing fiber through a plurality of plates defining orifices for receiving the fiber optic waveguide and the at least one reinforcing fiber, the plurality of plates providing a guide path for the fiber optic waveguide and the at least one reinforcing fiber through the binding resin bath.

9. The process of claim 7 wherein the step of transporting the fiber optic waveguide and the at least one reinforcing fiber through the binding resin bath includes pre-heating the binding resin to a selected temperature prior to transporting the fiber optic waveguide and the at least on reinforcing fiber through the binding resin bath.

10. The process of claim 9 wherein the selected temperature is from about 60° C. to about 100° C.

11. The process of claim 9 wherein the step of pre-heating the binding resin to a selected temperature includes the step of maintaining the temperature of the binding resin in a selected range.

12. The process of claim 11 wherein the selected temperature range is from about 60° C. to about 100° C.

13. The process of claim 7 wherein the step of transporting the fiber optic waveguide and the at least one reinforcing fiber through the binding resin bath includes re-circulating the resin through the binding resin bath.

14. The process of claim 13 wherein the step of re-circulating the binding resin includes re-circulating the binding resin in a direction opposite the direction of transportation of the fiber optic waveguide and the at least one reinforcing fiber.

15. The process of claim 2 wherein the at least one reinforcing fiber is selected from the group of Aramid, carbon, glass, or ultra-high molecular weight polyolefin.

16. The process of claim 2 wherein at least one reinforcing fiber is an electrical conductor.

17. The process of claim 2 wherein the binding resin is selected such that it imparts a strain elongation at failure greater that 2%.

18. The process of claim 2 wherein the step of curing the binding resin coated fiber optic waveguide and the at least one reinforcing fiber so as to form a cable includes the step of transporting the binding-resin-coated fiber optic waveguide and the at least on reinforcing fiber through an UV/visible light curing station.

19. The process of claim 18 wherein the fiber optic waveguide and the at least one reinforcing fiber are transported through UV/visible light curing station at a constant speed of about 5 up to about 300 feet per minute, the curing station having a power rating of greater than 200 watts per inch, and having a length of about 1 inch to about 96 inches.

20. The process of claim 1 wherein the step of impelling the fiber optic cable into the duct comprises:
  (i) linearly aligning the fiber optic cable with the means for impelling the fiber optic cable into the duct, the means having a motive force, the motive force for imparting sufficient translational force to the cable to impel the cable to a selected location in the duct;
  (ii) guiding the fiber optic cable to the motive force; and
  (iii) impelling the fiber optic cable to the selected location in the duct.

21. The process of claim 20 wherein the step of guiding the fiber optic cable to the motive force includes the step of guiding the fiber optic cable through an inlet guide to the motive force, the inlet guide in linear alignment with the motive force, the inlet guide providing a path for the fiber optic cable.

22. The process of claim 20 wherein the step of impelling the fiber optic cable includes the steps of:
  (a) guiding the fiber optic cable between the motive force and the duct; and
  (b) applying motive force to the fiber optic cable and impelling the fiber optic cable to the selected level in the duct.

23. The process of claim 22 wherein the step of guiding the fiber optic cable between the motive force and the duct includes the step of guiding the fiber optic cable through an insertion guide, the insertion guide in linear alignment with the inlet guide, the motive force and the duct, the insertion guide positioned to provide a guide path for the fiber optic cable to the duct.

24. The process of claim 23 wherein the step of guiding the fiber optic cable through an insertion guide includes the step of guiding the fiber optic cable through an intermediate guide, the intermediate guide linearly positioned between the motive force and the insertion guide, the intermediate guide for providing a guide path for the cable between the motive force and the insertion guide.

25. The process of claim 21 wherein the inlet guide is capillary tubing constructed from the group of carbon fiber, ceramics, polyvinylchloride, polyolefin, stainless steel, or steel.

26. The process of claim 24 wherein the insertion guide and the intermediate guide are capillary tubing, constructed from the group of carbon fiber, ceramics, polyvinylchloride, polyolefin, stainless steel, or steel.

27. The process of claim 20 in which the motive force includes a feed wheel having a known circumference, a pressure roller, the pressure roller in radial alignment with the feed wheel, the feed wheel and the pressure roller forming an aperture for receipt of the fiber optic cable, means for biasing the pressure roller against the fiber optic cable, and a power source for imparting rotational movement to the feed wheel, and whereby the step of applying the motive force to the fiber optic cable includes:
  (i) biasing the pressure roller against the fiber optic cable; and
  (ii) applying rotational movement to the feed wheel.

28. The process of claim 27 wherein the step of biasing the pressure roller against the fiber optic cable includes adjusting the bias of spring-tension screws.

29. The process of claim 1 wherein the step of impelling the fiber optic cable into the duct includes the step of monitoring the length of fiber optic cable inserted in the duct.

30. The process of claim 29 wherein the step of monitoring the length of fiber optic cable inserted in the duct includes the step of displaying the monitored length of fiber optic cable.

31. The process of claim 29 wherein the step of monitoring the length of fiber optic cable inserted in the duct includes the step of recording such monitored length of fiber optic cable.

32. The process of claim 2 wherein the step of transporting the fiber optic cable to the insertion means includes winding the fiber optic cable on a reel, the reel for transporting the fiber optic cable to the means for impelling the cable.

33. A process for inserting a fiber optic cable into a duct, the process including:

(a) receiving a fiber optic waveguide from a source;

(b) disposing at least one reinforcing fiber about the fiber optic waveguide;

(c) simultaneously coating the fiber optic waveguide and the at least one reinforcing fiber with a UV/visible light curable resin, the resin for binding the fiber optic waveguide and the at least one reinforcing fiber;

(d) curing the binding resin-coated fiber optic waveguide and the at least one reinforcing fiber so as to form a semi-flexible fiber optic cable; and (e) aligning the fiber optic cable with a motive force, the motive force for imparting sufficient force to the cable to impel the cable to a selected location in the duct;

(f) guiding the fiber optic cable to the motive force; the motive force for applying a translational force to the fiber optic cable; and (g) retrievably impelling the fiber optic cable into the duct by means of the motive force.

34. The process of claim 33 wherein the step for receiving the fiber optic waveguide includes:

(i) linearly aligning the fiber optic waveguide with a means for imparting the binding resin; and (ii) transporting the fiber optic waveguide to the means for imparting the binding resin.

35. The process of claim 34 wherein the step for transporting the fiber optic waveguide to the means for imparting the binding resin additionally includes the steps of:

(a) pre-coating the fiber optic waveguide with an UV/visible light curable resin, the resin selected to buffer the fiber optic waveguide; and (b) curing the pre-coated fiber optic waveguide.

36. The process of claim 35 wherein the step for pre-coating the fiber optic waveguide is performed at a temperature from about ambient or above.

37. The process of claim 34 wherein the step for receiving the fiber optic waveguide includes the step of transporting the fiber optic waveguide by means of feed rolls and bobbins, in a substantially linear alignment, to the means for coating the fiber optic waveguide and the at least one reinforcing fiber with the binding resin.

38. The process of claim 33 wherein the step of simultaneously coating the fiber optic waveguide and the at least one reinforcing fiber with the binding resin to includes the step of transporting the fiber optic waveguide and the at least one reinforcing fiber through a binding resin bath.

39. The process of claim 38 wherein the step of transporting the fiber optic waveguide and the at least one reinforcing fiber through the binding resin bath includes transporting the fiber optic waveguide and the at least one reinforcing fiber through a plurality of plates defining orifices for receiving the fiber optic waveguide and the at least one reinforcing fiber, the plurality of plates providing a guide path for the fiber optic waveguide and the at least one reinforcing fiber through the binding resin bath.

40. The process of claim 39 wherein the step of transporting the fiber optic waveguide and the at least one reinforcing fiber through the binding resin bath includes pre-heating the binding resin to a selected temperature prior to transporting the fiber optic waveguide and the at least on reinforcing fiber through the binding resin bath.

41. The process of claim 40 wherein the selected temperature is from about 60° C. to about 100° C.

42. The process of claim 40 wherein the step of pre-heating the binding resin to a selected temperature includes the step of maintaining the temperature of the binding resin in a selected range.

43. The process of claim 42 wherein the selected temperature range is from about 60° C. to about 100° C.

44. The process of claim 38 wherein the step of transporting the fiber optic waveguide and the at least one reinforcing fiber through the binding resin bath includes the step of re-circulating the binding resin through the resin bath.

45. The process of claim 44 wherein the step of re-circulating the binding resin includes re-circulating the binding resin in a direction opposite the direction of transportation of the fiber optic waveguide and the at least one reinforcing fiber.

46. The process of claim 33 wherein the at least one reinforcing fiber is selected from the group of Aramid, carbon, glass, or ultra-high molecular weight polyolefin.

47. The process of claim 33 wherein the at least one of the reinforcing fiber is an electrical conductor.

48. The process of claim 33 wherein the binding resin is selected such that it imparts a strain elongation at failure greater that 2%.

49. The process of claim 33 wherein the step of curing the binding resin coated fiber optic waveguide and the at least one reinforcing fiber so as to form a cable includes the step of transporting the binding resin-coated fiber optic waveguide and the at least one reinforcing fiber through an UV/visible light curing station.

50. The process of claim 49 wherein the fiber optic waveguide and the at least one reinforcing fiber is transported through UV/visible light curing station curing station at a constant speed of 5 up to about 300 feet per minute, the curing station having a power rating greater than 200 watts per inch, and having a length of about 1 inch to about 96 inches.

51. The process of claim 33 wherein the step of aligning the fiber optic cable with the motive force includes the step of guiding the fiber optic cable through an inlet guide to the motive force, the inlet guide in linear alignment with the motive force, the inlet guide providing a path for the fiber optic cable.

52. The process of claim 33 wherein the step of impelling the fiber optic cable includes the steps of:

(i) guiding the fiber optic cable between the motive force and the duct; and (ii) applying motive force to the fiber optic cable and impelling the fiber optic cable to a selected level in the duct.

53. The process of claim 52 wherein the step of guiding the fiber optic cable between the motive force and the duct includes the step of guiding the fiber optic cable through an insertion guide, the insertion guide in linear alignment with the inlet guide, the motive force and the duct, the insertion guide positioned to provide a guide path for the fiber optic cable to the duct.

54. The process of claim 53 wherein the step of guiding the fiber optic cable through an insertion guide includes the step of guiding the fiber optic cable through an intermediate guide, the intermediate guide linearly positioned between the motive force and the insertion guide, the intermediate guide for providing a guide path for the cable between the motive force and the insertion guide.

55. The process of claim 51 wherein the inlet guide is capillary tubing constructed from the group of carbon fiber, ceramics, polyvinylchloride, polyolefin, stainless steel, or steel.

56. The process of claim 54 wherein the insertion guide and the intermediate guide are capillary tubing, constructed from the group of carbon fiber, ceramics, polyvinylchloride, polyolefin, stainless steel, or steel.

57. The process of claim 33 in which the motive force includes a feed wheel having a known circumference, a pressure roller, the pressure roller in radial alignment with the feed wheel, the feed wheel and the pressure roller forming an aperture for receipt of the fiber optic cable, means for biasing the pressure roller against the fiber optic cable, and a power source for imparting rotational movement to the feed wheel, and whereby the step of applying the motive force to the fiber optic cable includes:

(i) biasing the pressure roller against the fiber optic cable; and (ii) applying rotational movement to the feed wheel.

58. The process of claim 57 wherein the step of biasing the pressure roller against the fiber optic cable includes adjusting the bias of spring-tension screws.

59. The process of claim 33 wherein the step of impelling the fiber optic cable into the duct includes the step of monitoring the length of fiber optic cable inserted in the duct.

60. The process of claim 59 wherein the step of monitoring the length of fiber optic cable inserted in the duct includes the step of displaying monitored length of fiber optic cable.

61. The process of claim 59 wherein the step of monitoring the length of fiber optic cable inserted in the duct includes the step of recording such monitored length of fiber optic cable.

62. The process of claim 33 wherein the step of transporting the fiber optic cable to the insertion means includes the additional step of winding the fiber optic cable on a reel, the reel for transporting the fiber optic cable to the means for impelling the cable.

63. A process for inserting a fiber optic cable into a duct, the process including:

(a) pre-heating a binding resin bath, the binding resin bath for coating a fiber optic waveguide and at least one strengthening fiber with an UV/visible light curable resin, the resin for binding the fiber optic waveguide and the at least one reinforcing fiber, the resin bath pre-heated to a selected temperature prior to transporting the fiber optic waveguide and the at least one reinforcing fiber through the binding resin bath, the selected temperature from about 60° C. to about 100° C.;

(b) linearly aligning the fiber optic waveguide with the binding resin;

(c) disposing at least one reinforcing fiber about the fiber optic waveguide;

(d) transporting the fiber optic waveguide and the at least one reinforcing fiber through the binding resin bath, the step of transporting the fiber optic waveguide and the at least one reinforcing fiber through the binding resin bath including the step of transporting the fiber optic waveguide and the at least one reinforcing fiber through a plurality of plates defining orifices for receiving the fiber optic waveguide and the at least one reinforcing fiber, the plurality of plates providing a guide path through the binding resin bath for the fiber optic waveguide and the at least one reinforcing fiber;

(e) simultaneously coating the fiber optic waveguide and the at least one reinforcing fiber with the binding resin while temperature of the binding resin is maintained in the selected range from about 60° C. to about 100° C.;

(f) curing the binding resin-coated fiber optic waveguide and the at least one reinforcing fiber in an UV/visible light curing station so as to form a fiber optic cable, whereby the binding resin-coated fiber optic waveguide and the at least one reinforcing fiber are transported through UV/visible light curing station at a constant speed of about 5 up to about 300 feet per minute, the curing station having a power rating of greater than 200 watts per inch, and having a length of about 1 inch to about 96 inches;

(g) transporting the fiber optic cable to an insertion means, the insertion means for imparting sufficient translational force to the cable to impel the cable to a selected location in the duct, the insertion means including an inlet guide, the inlet guide for providing a flow path for providing a guide path for the fiber optic cable, the inlet in linear alignment with a feed wheel, having a known circumference, a pressure roller, the pressure roller in radial alignment with the feed wheel, the feed wheel and the pressure roller forming an aperture for receipt of the fiber optic cable, the pressure roller for biasing the fiber optic cable against the feed wheel, a power source for imparting rotational movement to the feed wheel, an insertion guide, the insertion guide in linear alignment with the inlet guide, the insertion guide positioned to provide a guide path for the fiber optic cable to the duct the motive force includes a feed wheel;

(h) guiding the fiber optic cable through the inlet guide, the aperture between the feed wheel and the pressure roller, through the outlet guide, and into the duct, and whereby the step of applying the translational force to the fiber optic cable includes:

(i) biasing the pressure roller against the fiber optic cable; and (ii) applying rotational movement to a feed wheel, thereby impelling the fiber optic cable into the duct.

64. The process of claim 63 wherein the step for transporting the fiber optic waveguide to the means for imparting the binding resin bath additionally includes the steps of:

(a) pre-coating the fiber optic waveguide with a UV/visible light curable resin, the resin selected to buffer the fiber optic waveguide; and (b) curing the pre-coated fiber optic waveguide.

65. The process of claim 63 wherein the step for pre-coating the fiber optic waveguide is performed at a temperature of ambient or above and the resin is silicone.

66. The process of claim 63 wherein the step of transporting the fiber optic waveguide and the at least one reinforcing fiber through the binding resin bath includes the step of re-circulating the binding resin through the resin bath.

67. The process of claim 66 wherein the step of re-circulating the binding resin includes re-circulating the binding resin in a direction opposite the direction of transportation of the fiber optic waveguide and the at least one reinforcing fiber.

68. The process of claim 63 wherein the binding resin is selected such that it imparts a strain elongation at failure greater that 2% to the fiber optic cable.

69. The process of claim 63 wherein the at least one reinforcing fiber is selected from the group of Aramid, carbon, glass, or ultra-high molecular weight polyolefin.

70. The process of claim 2 wherein at least one of the reinforcing fiber is an electrical conductor.

71. The process of claim 63 wherein the step of transporting the fiber optic cable through the motive force means includes the step of guiding the fiber optic cable through an intermediate guide linearly positioned between the feed wheel and the insertion guide means, the intermediate guide for providing a guide path for the cable between the feed wheel and the insertion guide.

72. The process of claim 63 wherein the step of transporting the fiber optic cable to the insertion means includes the additional step of winding the fiber optic cable on a reel, the reel for transporting the fiber optic cable to the means for impelling the cable.

73. The process of claim 63 wherein the inlet guide and insertion guide are capillary tubing constructed from the group of carbon fiber, ceramics, polyvinylchloride, polyolefin, stainless steel, or steel.

74. The process of claim 71 wherein the intermediate guide and the insertion guide are capillary tubing constructed from the group of consisting of carbon fiber, ceramics, polyvinylchloride, polyolefin, stainless steel, or steel.

75. The process of claim 63 wherein the step of biasing the pressure roller against the fiber optic cable includes adjusting the bias of spring-tension screws.

76. The process of claim 63 wherein the step of impelling the fiber optic cable into the duct includes the step of monitoring the length of fiber optic cable inserted in the duct.

77. The process of claim 76 wherein the step of monitoring the length of fiber optic cable inserted in the duct includes the step of displaying monitored length of fiber optic cable.

78. The process of claim 76 wherein the step of monitoring the length of fiber optic cable inserted in the duct includes the step of recording such monitored length of fiber optic cable.

79. A process for making a strengthened cable, the process comprising:
(a) receiving a fiber optic waveguide from a source;
(b) pre-coating the fiber optic waveguide with an UV/visible light curable silicone resin, the resin selected to buffer the fiber optic waveguide at a temperature of about ambient or above;
(c) curing the pre-coated fiber optic waveguide;
(d) disposing at least one reinforcing fiber about the fiber optic waveguide;
(e) simultaneously coating the fiber optic waveguide and the at least one reinforcing fiber with a UV/visible light curable resin, the resin for binding the fiber optic waveguide and the at least one reinforcing fiber, the resin consisting of a formulation of heterocyclic high temperature (meth)acrylate resins;
(f) curing the binding resin coated fiber optic waveguide and the at least one reinforcing fiber so as to form a semi-flexible cable; and
(g) collecting the fiber optic cable.

80. The process of claim 79 wherein the step for receiving the fiber optic waveguide includes:
(a) linearly aligning the fiber optic waveguide with a means for imparting the resin; and
(b) transporting the fiber optic waveguide to the means for imparting the resin.

81. The process of claim 80 wherein the step for transporting the fiber optic includes transporting the fiber optic waveguide by means of feed rolls and bobbins in a substantially linear alignment to the means for imparting the resin to the fiber optic waveguide and the at least one reinforcing fiber.

82. The process of claim 79 wherein the step of simultaneously imparting the resin includes transporting the fiber optic waveguide and the at least one reinforcing fiber through a resin bath.

83. The process of claim 82 wherein the step of transporting the fiber optic waveguide and the at least one reinforcing fiber through the resin bath includes transporting the fiber optic waveguide and the at least one reinforcing fiber through a plurality of plates defining orifices for receiving the fiber optic waveguide and the at least one reinforcing fiber, the plurality of plates providing a guide-path through the resin bath for the fiber optic waveguide and the at least one reinforcing fiber.

84. The process of claim 83 wherein the step of simultaneously coating the fiber optic waveguide and the at least one reinforcing fiber with an UV/visible light curable binding resin includes heating the resin to a selected temperature prior to transporting the fiber optic waveguide and the at least on reinforcing fiber through the resin bath.

85. The process of claim 84 wherein the step of heating the resin to a selected temperature includes maintaining the temperature of the resin in a selected range.

86. The process of claim 84 wherein the step of simultaneously coating the fiber optic waveguide and the at least one reinforcing fiber with an UV curable resin includes re-circulating the resin through the resin bath.

87. The process of claim 86 wherein the step of re-circulating the resin includes re-circulating the resin in a direction opposite the direction of transportation of the fiber optic waveguide and the at least one reinforcing fiber.

88. The process of claim 79 wherein the step of curing the binding resin-coated fiber optic waveguide and the at least one reinforcing fiber in an UV/visible light curing station includes the step of transporting the binding resin-coated fiber optic waveguide and the at least one reinforcing fiber through an UV/visible light curing station at a constant speed of about 5 up to about 300 feet per minute, the curing station having a power rating of greater than 200 watts per inch, and having a length of about 1 inch to about 96 inches.

89. The process of claim 79 wherein the binding resin is selected such that it imparts a strain elongation at failure greater that 2% to the fiber optic cable.

90. The process of claim 79 wherein the at least one reinforcing fiber is selected from the group of Aramid, carbon, glass, or ultra-high molecular weight polyolefin.

91. The process of claim 79 wherein at least one of the reinforcing fiber is an electrical conductor.

92. A process for making a strengthened cable, the process including:
(a) receiving a fiber optic waveguide from a source;
(b) pre-coating the fiber optic waveguide with an UV/visible light curable silicone resin, the resin selected to buffer the fiber optic waveguide at a temperature of about ambient or above;
(c) curing the pre-coated fiber optic waveguide;
(d) pre-heating a binding resin bath, the binding resin bath for coating a fiber optic waveguide and at least one strengthening fiber with an UV/visible light curable resin, the resin for binding the fiber optic waveguide and the at least one reinforcing fiber, the resin bath pre-heated to a selected temperature prior to transporting the fiber optic waveguide and the at least one reinforcing fiber through the binding resin bath, the selected temperature from about 60° C. to about 100° C., and wherein the binding resin is selected such that it imparts a strain elongation at failure greater that 2% to the fiber optic cable;

(e) linearly aligning the fiber optic waveguide with the binding resin;

(f) disposing at least one reinforcing fiber about the fiber optic waveguide;

(g) linearly transporting, by means of feed rolls and bobbins in a substantially linear alignment to the binding resin bath, the fiber optic waveguide and the at least one reinforcing fiber through the binding resin bath, the step of transporting the fiber optic waveguide and the at least one reinforcing fiber through the binding resin bath including the step of transporting the fiber optic waveguide and the at least one reinforcing fiber through a plurality of plates defining orifices for receiving the fiber optic waveguide and the at least one reinforcing fiber, the plurality of plates providing a guide path through the binding resin bath for the fiber optic waveguide and the at least one reinforcing fiber;

(h) simultaneously coating the fiber optic waveguide and the at least one reinforcing fiber with the binding resin while temperature of the binding resin is maintained in the selected range from about 60° C. to about 100° C., the binding resin consisting of a formulation of heterocyclic high temperature (meth)acrylate resins;

(i) curing the binding resin-coated fiber optic waveguide and the at least one reinforcing fiber in an UV curing station so as to form a fiber optic cable, whereby the binding resin-coated fiber optic waveguide and the at least one reinforcing fiber are transported through UV curing station at a constant speed of about 5 up to about 300 feet per minute, the curing station having a power rating of greater than 200 watts per inch, and having a length of about 1 inch to about 96 inches; and (j) collecting the fiber optic cable.

93. The process of claim 92 wherein the step of simultaneously coating the fiber optic waveguide and the at least one reinforcing fiber with an UV/visible light curable resin includes re-circulating the resin through the resin bath.

94. The process of claim 92 wherein the step of re-circulating the resin includes re-circulating the resin in a direction opposite the direction of transportation of the fiber optic waveguide and the at least one reinforcing fiber.

95. The process of claim 92 wherein the at least one reinforcing fiber is selected from the group of Aramid, carbon, glass, and ultra-high molecular weight polyolefin.

96. The process of claim 92 wherein at least one of the reinforcing fiber is an electrical conductor.

* * * * *